United States Patent [19]

Likens et al.

[11] Patent Number: 5,608,798
[45] Date of Patent: Mar. 4, 1997

[54] CRYTOGRAPHIC DEVICE WITH SECURE TESTING FUNCTION

[75] Inventors: Thomas H. Likens, Fort Worth; Matthew H. Childs, Arlington, both of Tex.

[73] Assignee: National Semiconductor Corporation, Santa Clara, Calif.

[21] Appl. No.: 520,917

[22] Filed: Aug. 30, 1995

[51] Int. Cl.$^6$ ........................................ H04K 1/00
[52] U.S. Cl. ................................................ 380/2
[58] Field of Search ..................................... 380/2

[56]  References Cited

U.S. PATENT DOCUMENTS 5,432,848   7/1995   Butter et al. ............................... 380/2

Primary Examiner—David C. Cain
Attorney, Agent, or Firm—Limbach & Limbach L.L.P.

[57] ABSTRACT

A method of securely testing a cryptographic device need not be carried out in a secure testing facility by cleared personnel. First, a test cycle total count number is provided. Then, for each of a plurality of test cycles, the number being determined from the test cycle total count number, an input data signal is provided to the cryptographic device. The input data signal is encrypted to determine an encrypted signal, and the encrypted signal is then decrypted to determine a decrypted signal. Finally, the input data signal is compared to the decrypted signal. A cryptographic device includes receiving circuitry for receiving the input data signal and encryption circuitry that encrypts the input data signal to determine the encrypted signal. Decryption circuitry decrypts the encrypted signal to determine a decrypted signal, and comparing circuitry compares the input data signal to the decrypted signal. Finally, sequencing circuitry causes a plurality of input data signals to he sequentially provided to the receiving circuitry during a plurality of test cycles, one input data signal per test cycle.

8 Claims, 1 Drawing Sheet

CRYTOGRAPHIC DEVICE WITH SECURE TESTING FUNCTION

TECHNICAL FIELD OF THE INVENTION

The present invention relates to testing of cryptographic devices and, in particular, to a cryptographic device which can be tested in an unsecure environment without breaching the security of the device.

BACKGROUND OF THE INVENTION

Testing of cryptographic devices is well known in the art. In particular, a cryptographic device is conventionally tested by providing a vector set to the cryptographic device, allowing the cryptographic device to encrypt the vector, and examining the encrypted output to determine if the vector set has been properly encrypted.

However, because of the secure nature of cryptographic devices, maintenance of the test vectors, and the testing itself, must be conducted in a secure facility by cleared personnel. Furthermore, the test vectors must be carefully chosen to obtain maximum test coverage of the cryptographic device. These constraints make the conventional testing methods extremely expensive.

SUMMARY OF THE INVENTION

The present invention is a method of securely testing a cryptographic device which need not be carried out in a secure testing facility by cleared personnel. First, a test cycle total count number is provided. Then, for each of a plurality of test cycles, the number being determined from the test cycle total count number, an input data signal is provided to the cryptographic device. The input data signal is encrypted to determine an encrypted signal, and the encrypted signal is decrypted to determine a decrypted signal. Finally, the input data signal is compared to the decrypted signal.

A cryptographic device in accordance with the present invention includes receiving circuitry for receiving the input data signal and encryption circuitry that encrypts the input data signal to determine the encrypted signal. Decryption circuitry decrypts the encrypted signal to determine a decrypted signal, and comparing circuitry compares the input data signal to the decrypted signal. Finally, sequencing circuitry causes input data signals to be sequentially provided to the receiving circuitry, one input data signal per test cycle, during a plurality of test cycles.

A better understanding of the features and advantages of the invention will be obtained by reference to the following detailed description and accompanying drawings which set forth an illustrative embodiment in which the principles of the invention are utilized.

DETAILED DESCRIPTION

Figure 1:
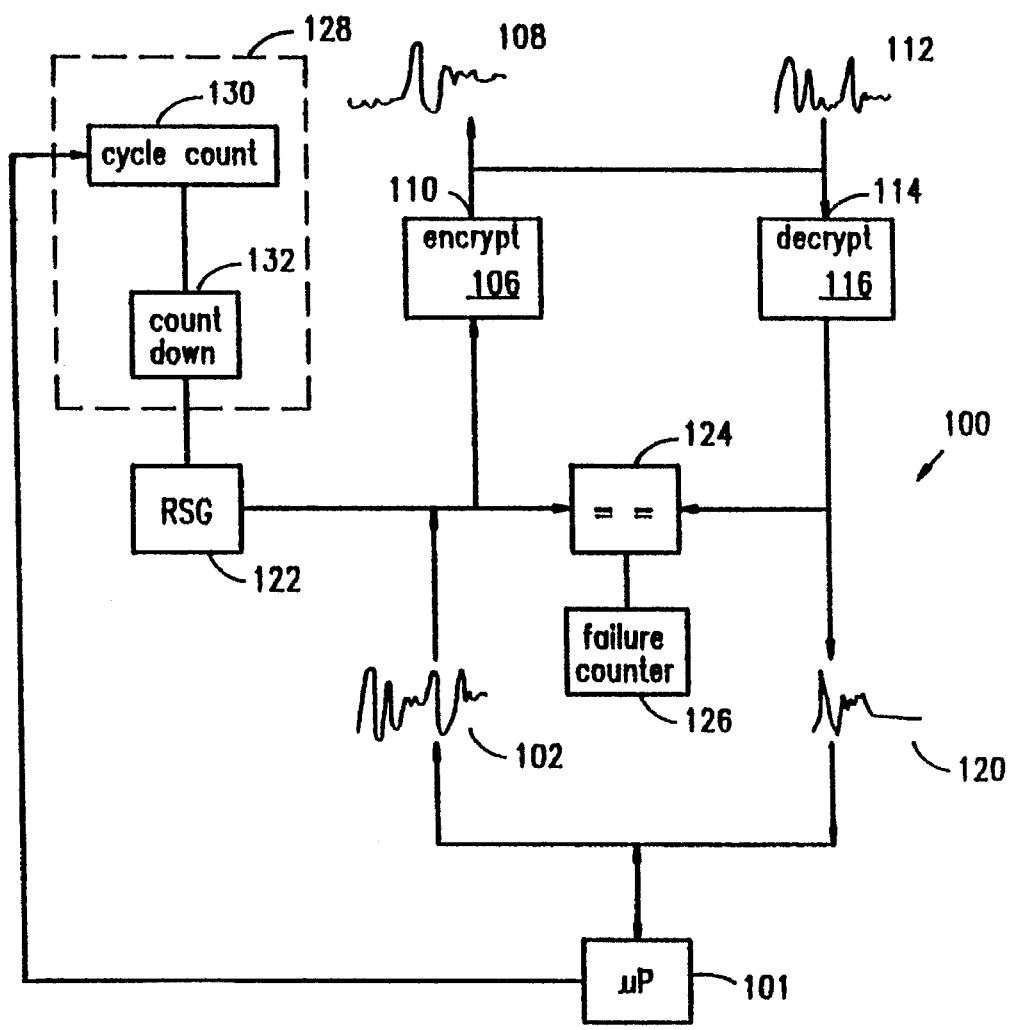
FIG. 1 illustrates, in block form, a cryptographic device in accordance with an embodiment of the present invention.
Figure 2:
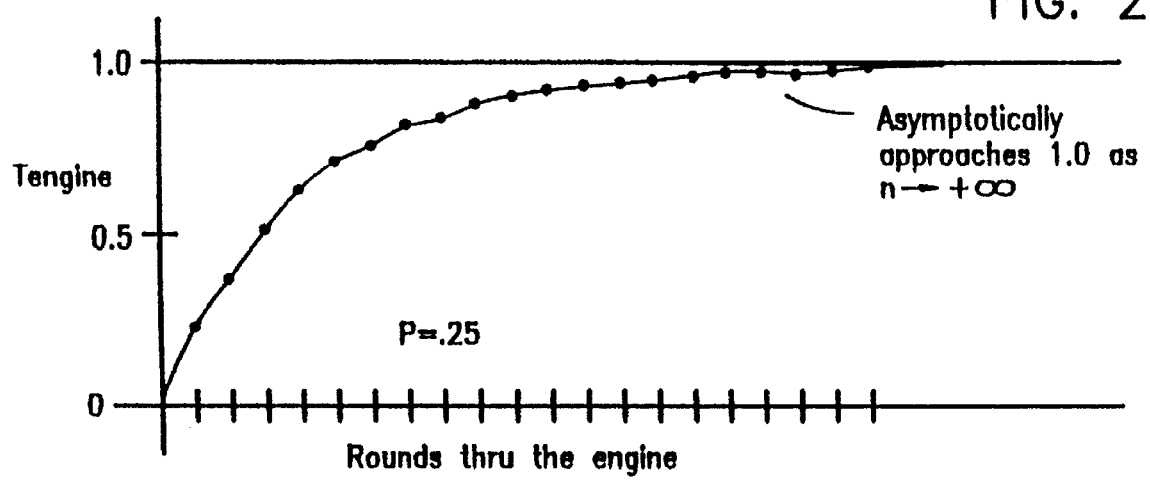
FIG. 2 is a graph of amount of logic tested versus the number of test cycles.

Referring to FIG. 1, a cryptographic device 100 in accordance with an embodiment of the present invention is illustrated therein. In normal operation of the cryptographic device 100, data signals 102 to be encrypted are provided (e.g., by a processor 101) to an input terminal 104 of an encryption circuit 106 of the cryptographic device 100. The encryption circuit 106 encrypts the data signals 102 to generate encrypted data signals 108, which are provided to an output terminal 110 for subsequent transmission. Conversely, in normal operation of the cryptographic device 100, encrypted data signals 112 to be decrypted are provided to an input terminal 114 of a decryption circuit 116. The decryption circuit decrypts the data signals 112 and provides the decrypted data signals 120 to an output terminal 118 for use by the processor 101.

To test the cryptographic device 100, in accordance with an embodiment of the present invention, random signals are provided to the input terminal 104 of the encryption circuit 106 from a random signal generator 122 in place of data signals 102 which would otherwise be provided by the processor 101. The random signal generator 122 may be conventional. For example, in practice, the signals provided by the random signal generator 122 may not be truly random but, rather, may be "pseudo-random" in nature. The encryption circuit 106 encrypts the random signals and provides the encrypted random signals to the output terminal 110 of the encryption circuit 106. The encrypted random signals are then provided to the input terminal 114 of the decryption circuit 116, and the decryption circuit decrypts the encrypted random signals. The decrypted signals are provided to the output terminal 118 of the decryption circuit 116.

A comparator 124 receives the decrypted signals and compares them to the input random signals. If the decrypted encrypted random signal is different from the input random signal, then a failure counter 126 coupled to the comparator 124 is incremented. Assuming that the random signal generator 122 generates signals with truly random properties, then the cryptographic engine (i.e., the encryption circuit 106 and the decryption circuit 116) will be fully tested if the cryptographic device 100 is subject to enough test cycles. For example, if $T_{engine}$ represents the logic tested in the cryptographic engine and n represents the number of test cycles, then $$T_{engine} = 1 - (1-P)^n$$

where $$P = \frac{\% \text{ logic tested}}{\text{cycles through engine}}$$

When $T_{engine}$ equals one (i.e., n approaches infinity), all the logic of the cryptographic engine will be tested.

Of course, as more cryptographic engine logic is tested on each test cycle, fewer test cycles are required to fully test the cryptographic device 100. The optimum number of test cycles is determinable from "P".

Sequencing circuitry 128 controls the sequencing of the test cycles according to a "cycle count" held in a cycle count register 130. The cycle count register 128 may be loaded from the processor 101. When a test sequence is initialized, the cycle total count is copied form the cycle count register 130 to a "count down" register 132. The count down register 132 is so named because it counts down by one at each test cycle. When the value in the count down register 132 goes to zero, the test is complete.

Alternately, the count down register 132 could instead be a count up register which is initialized to 1 and which is incremented at each test cycle. The test would be complete when the value in the count up register equalled the cycle total count value in the cycle count register 130.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A method of securely testing a cryptographic device, comprising:

providing a test cycle total count number; and for each of a plurality of test cycles, the number of test cycles being determined from the test cycle total count number:

providing an input data signal to the cryptographic device;

encrypting the input data signal to determine an encrypted signal;

decrypting the encrypted signal to determine a decrypted signal; and comparing the input data signal to the decrypted signal.

2. The method of claim 1, wherein the input data signals collectively constitute a substantially randomly-distributed sequence over the plurality of test cycles.

3. The method of claim 1, and further comprising a step of initially determining the test cycle total count number in accordance with a desired scope of test coverage.

4. A cryptographic device having secure self-test capability, comprising:

receiving circuitry that receives an input data signal;

encryption circuitry that encrypts the input data signal to determine an encrypted data signal;

decryption circuitry that decrypts the encrypted data signal to determine a decrypted data signal;

comparing circuitry that compares the input data signal to the decrypted data signal; and sequencing circuitry that causes input data signals to be sequentially provided to the receiving circuitry during a plurality of test cycles one input data signal per test cycle.

5. The cryptographic device of claim 4, wherein the sequentially provided input data signals collectively constitute a substantially randomly-distributed sequence.

6. The cryptographic device of claim 4, and further comprising random number generator circuitry that generates the input data signals.

7. The cryptographic device of claim 4, and further comprising programmable holding circuitry that holds a programmable test cycle total count number, wherein a number of test cycles is determined from the test cycle total count number.

8. The cryptographic device of claim 7, wherein the input data signals are substantially randomly-distributed.

* * * * *

UNITED STATES PATENT AND TRADEMARK OFFICE
CERTIFICATE OF CORRECTION

PATENT NO. : 5,608,798
DATED : March 4, 1997
INVENTOR(S) : Thomas H. Likens et al.

It is certified that error appears in the above-indentified patent and that said Letters Patent is hereby corrected as shown below:

On the title page, item [54] and column 1, line 1, delete "CRYTOGRAPHIC" and replace with --CRYPTOGRAPHIC--.

Signed and Sealed this

Thirteenth Day of May, 1997

*Attest:*

BRUCE LEHMAN

*Attesting Officer*  Commissioner of Patents and Trademarks